US009727872B2

(12) United States Patent
Popescu et al.

(10) Patent No.: US 9,727,872 B2
(45) Date of Patent: Aug. 8, 2017

(54) UTILIZING NEAR FIELD COMMUNICATION TO IMPROVE CUSTOMER INTERACTIONS

(71) Applicant: Moneygram International, Inc., Minneapolis, MN (US)

(72) Inventors: Daniela Popescu, Littleton, CO (US); Mark Crowson, South Lincolnshire (GB); Elena Trubitsyna, London (GB); Pak Kiu Tse, Yuen Long (HK); Nicholas Ware, Middlesex (GB); David Walker, London (GB)

(73) Assignee: Moneygram International, Inc., Minneapolis, MN (US)

( * ) Notice: Subject to any disclaimer, the term of this patent is extended or adjusted under 35 U.S.C. 154(b) by 442 days.

(21) Appl. No.: 13/645,199

(22) Filed: Oct. 4, 2012

(65) Prior Publication Data
US 2014/0100925 A1 Apr. 10, 2014

(51) Int. Cl.
*G06Q 30/00* (2012.01)
*G06Q 30/02* (2012.01)
(Continued)

(52) U.S. Cl.
CPC ............ *G06Q 30/01* (2013.01); *G06Q 10/06* (2013.01); *G06Q 30/0282* (2013.01); *G06Q 40/04* (2013.01)

(58) Field of Classification Search
None
See application file for complete search history.

(56) References Cited

U.S. PATENT DOCUMENTS

| 2005/0157865 A1* | 7/2005 | Yeager | G07C 11/00 379/266.06 |
| 2005/0177423 A1* | 8/2005 | Swanson, Sr. | G06Q 30/00 705/14.1 |

(Continued)

OTHER PUBLICATIONS

The Financial Brand: "Mobile App Provides Wait Times, helps Branch Users Avoid Queues" Marketing Insights for Banks & Credit Unions, on-line published on Jun. 28, 2012, 3 pages.

(Continued)

*Primary Examiner* — Eric Netzloff
*Assistant Examiner* — Christopher Stroud
(74) *Attorney, Agent, or Firm* — Norton Rose Fulbright US LLP (57) ABSTRACT

Systems, methods and devices which utilize near field communication-style technologies in conjunction with one or more of personal devices and communication networks in order to provide for improved customer interactions with a service establishment are provided. In one embodiment an application is configured to provide for various functionality upon the triggering of a near-field communication stimulus. For example, upon scanning a near field device, an application may launch that provides a user with pre-determined information. Such information may include information regarding the nearest locations of a service establishment and approximate wait times for transactions at the listed locations. In another embodiment, the pre-determined information may include information regarding promotions available to a customer such as special offers, coupons, advertisements, and the like.

9 Claims, 10 Drawing Sheets

(51) Int. Cl.
*G06Q 40/04* (2012.01)
*G06Q 10/06* (2012.01)

(56) References Cited

U.S. PATENT DOCUMENTS

| | | | |
|---|---|---|---|
| 2007/0239569 A1* | 10/2007 | Lucas | G06Q 10/08 705/28 |
| 2008/0041937 A1* | 2/2008 | Vawter | G06Q 20/367 235/380 |
| 2009/0076875 A1 | 3/2009 | Lert, Jr. et al. | |
| 2009/0144456 A1* | 6/2009 | Gelf | G06F 13/4022 710/8 |
| 2010/0279711 A1* | 11/2010 | Wilson et al. | 455/456.3 |
| 2012/0047070 A1 | 2/2012 | Pharris | |
| 2012/0072311 A1* | 3/2012 | Khan | 705/26.81 |
| 2012/0116957 A1 | 5/2012 | Zanzot et al. | |
| 2012/0202531 A1 | 8/2012 | Killian et al. | |
| 2012/0209749 A1 | 8/2012 | Hammad et al. | |
| 2013/0041775 A1* | 2/2013 | Rosenberg | G06Q 30/02 705/26.9 |
| 2013/0073365 A1* | 3/2013 | McCarthy | 705/14.23 |

OTHER PUBLICATIONS

Kacha, "The Micro Check-In Framework for the Next Generation of Location-Based Applications", on-line published Jul. 2012, 87 pages.
International Search Report and Written Opinion issued for PCT/US2013/057982, dated Jan. 17, 2014; 8 pages.
"NFC in Public Transport," Jan. 1, 2011, retrieved from internet; http://www.nfc-forum.org/resources/white paper, 33 pages.
The extended European Search Report issued for European Patent Application No. 13843968.2, dated Feb. 4, 2016, 8 pages.

* cited by examiner

UTILIZING NEAR FIELD COMMUNICATION TO IMPROVE CUSTOMER INTERACTIONS

TECHNICAL FIELD

The present application relates to near field communication devices, and more specifically to systems and methods which utilize near field communication devices to improve customer interactions.

BACKGROUND

Customer service industries and retail establishments spend large amounts of time and effort researching ways to improve customer experiences and interactions at a physical location. This is because the efficiency and convenience of a customer's transaction experience may affect the customer's desire to provide return business, or to provide referrals to friends and acquaintances of the customer to that business.

For example, if a customer desires to undertake a money transfer transaction, a typical customer experience will comprise the customer entering the money transfer location and waiting in line for service. While waiting for service, the customer may fill out paperwork to provide details for the transaction. Once the customer reaches the front of the line, an agent for the money transfer service will work with the customer to complete the transaction paperwork and to approve the transaction. In some instances the transaction approval process may include an additional waiting period.

It can be appreciated that this transaction process may become frustrating to a customer in the event that large waiting lines are present at the money transfer location. This process may cause the customer to look to other service providers for their next transaction or to discourage friends and family from utilizing the money transfer service in light of their personal experience.

Various businesses have attempted to insert efficiencies within similar transaction processes. Such efforts have included means to reduce paperwork or to provide a more pleasant experience to a customer while waiting in line. Many such efforts remain inadequate to achieve a point of efficiency in a manner that maximizes customer satisfaction.

BRIEF SUMMARY

The present application provides for systems, methods and devices which utilize near field communication-style technologies in conjunction with one or more of personal devices and communication networks in order to provide for improved customer interactions with a service or retail establishment.

In one embodiment a mobile device application is provided. The application is configured to provide for various functionality upon the triggering of a near-field communication stimulus. For example, upon scanning a near field device (such as a bar code, Quick Response (QR) code, Near Field Communication radio chip (NFC chip), Smart Card, Radio Frequency Identification (RFID) tag, and the like) an application may launch which provides a user with pre-determined information. Such information may include information regarding the nearest locations of a service establishment and/or approximate wait times for transactions at the listed locations. In such an embodiment, the application may be further configured to provide directions to one or more of the locations. In another embodiment, the pre-determined information may include information regarding promotions available to a customer such as special offers, coupons, advertisements, and the like.

Another embodiment may be realized within a system for implementing a customer encounter flow of a service establishment. Such an embodiment may include one or more near field communication-style contact points which assist in managing the flow of a customer encounter. For example, embodiments may include an off-site contact point configured to be scanned by a user device, whereupon information is provided to a user device after scanning the contact point. Such information may include information regarding how or where to conduct a transaction with a service establishment. Embodiments may further include a one or more contact points within the service establishment which are utilized throughout the flow of a transaction. For example, a contact point may be utilized to check in a customer and place the customer in a queue to await service. While awaiting service, a customer may provide information or an order for a transaction. This may be implemented on a customer device, a local kiosk, in person with an agent which has been provided with customer profile data, etc. When the customer is at the front of the queue, an employee of the service establishment may initiate another contact which is configured to trigger a process that identifies the customer, assists in retrieving information regarding a transaction, etc. Similar contacts may also be used to confirm aspects of a transaction, to provide proof of a completed transaction, and to eventually check out of the location. Further, in some embodiments, information obtained throughout the transaction flow may be utilized to improve the transaction flow, update waiting times, etc.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding, reference is now made to the following descriptions taken in conjunction with the accompanying drawings, in which.

DETAILED DESCRIPTION

The following description outlines multiple embodiments of the present application. It is noted that some embodiments are discussed in the context of a money transfer service, i.e. the service establishment is a money transfer business that facilitates transactions which allow a sending party to transfer funds to a receiving party. However, embodiments should not be limited to such. One of ordinary skill in the art will readily understand how the principles of these embodiments would apply to other applications, other business types, etc. For example, the inventive concepts utilized herein could be utilized to assist in the flow of a customer encounter in a retail establishment, a restaurant establishment, and the like.

Figure 1:
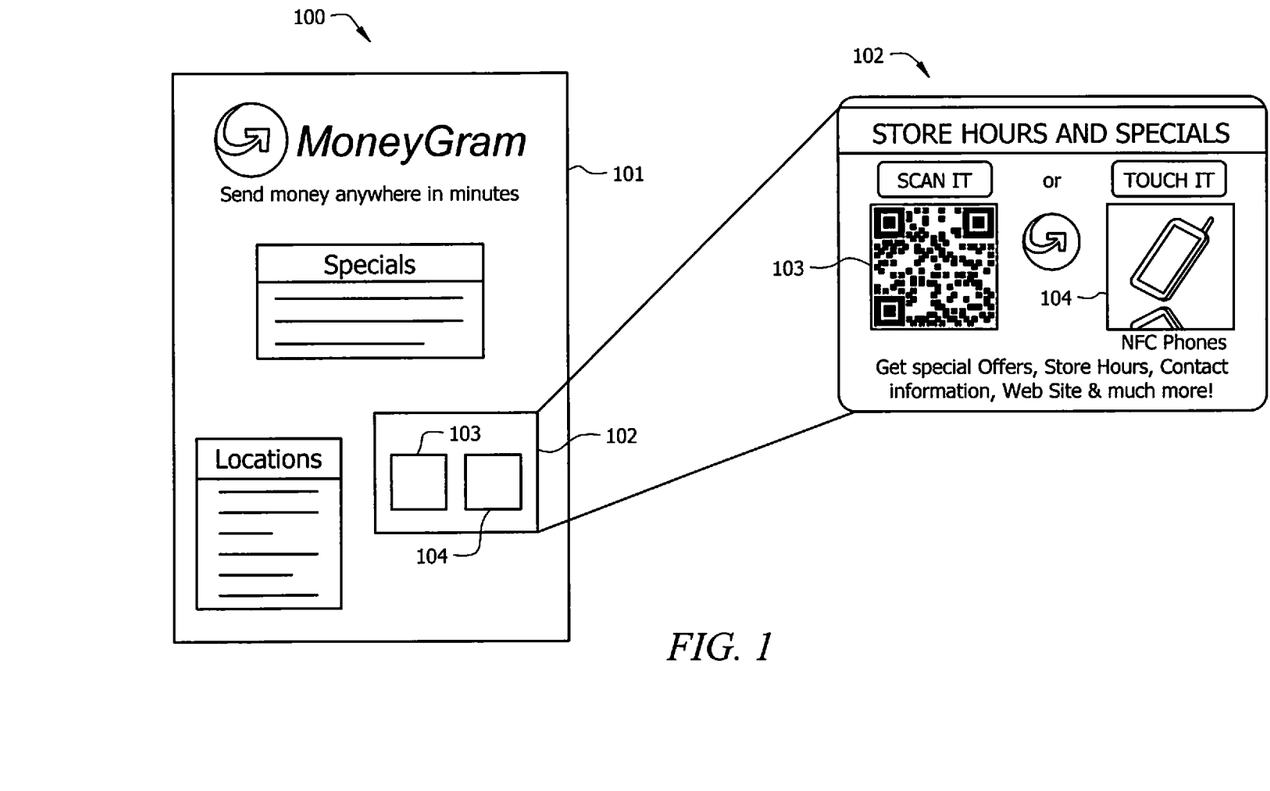
FIG. 1 illustrates a promotional advertisement, poster or sign in accordance with an embodiment of the present application.

FIG. 1 illustrates a promotional advertisement, poster or sign 100 in accordance with an embodiment of the present application. Sign 100 includes promotional text and/or graphics 101 for a particular service establishment. Sign 100 further includes a near field communication-style scanning area 102. Scanning area 102 may include any number and types of near field communication-style scanning devices. For example, scanning area 102 may include passive devices such as bar code, Quick Response (QR) code, etc., and/or active scanning devices which are configured to convey additional information to a scanning device such as a Near Field Communication radio chip (NFC chip), Smart Card, Radio Frequency Identification (RFID) tag, etc. In general, passive devices are scanned using a camera or infra-red scanning unit on a mobile device whereas active devices utilize a sensor or radio communication capabilities which actively receives data from the scanning device. As illustrated in FIG. 1, scanning area 102 includes a plurality of scanning devices, e.g. a QR code 103 and NFC chip 104.

Figure 2:
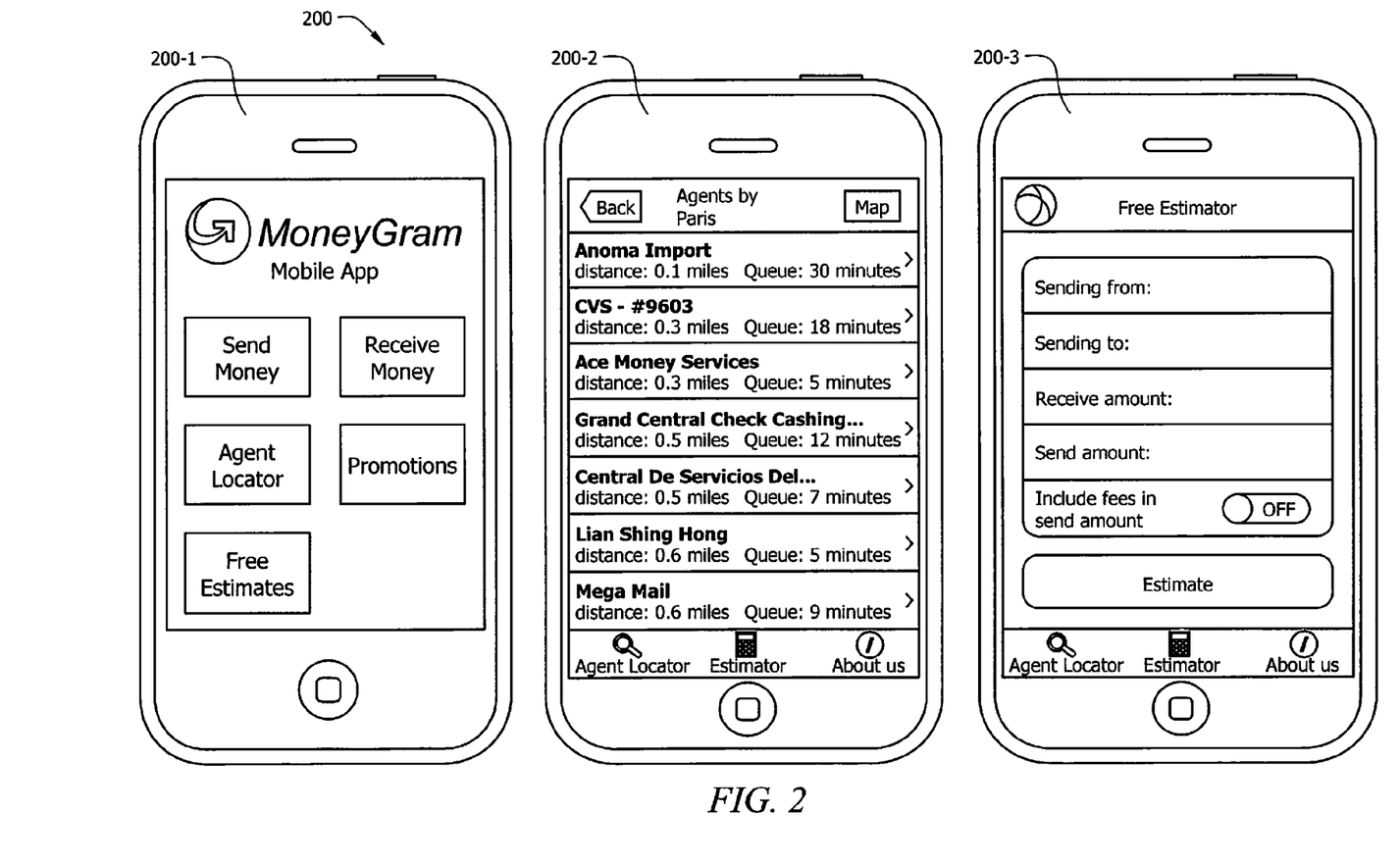
FIG. 2 illustrates multiple screenshots of a mobile device application in accordance with an embodiment of the present application.

FIG. 2 illustrates multiple screenshots 200-1, 200-2 and 200-3 of a mobile device application 200 in accordance with an embodiment of the present application. In the illustrated embodiment, the application corresponds to a money transfer service business and is configured to be utilized to assist with creating and receiving money transfer transactions, finding money transfer service locations, viewing promotions, etc.

Mobile device application 200 may be manually launched by a user of a mobile device, or may be automatically launched upon scanning a near field communication scanning device, such as QR code 103 or NFC chip 104 of FIG. 1. For example, a user may utilize mobile device application 200 similar to any normal application where it is launched during regular use of a smart phone and is utilized for its various functionality. In the illustrated embodiment, this functionality could include taking steps to locate a money transfer agent location (e.g. at 200-2) establish a money transfer transaction, or to calculate/estimate fees (e.g. at 200-3) for a money transfer transaction.

In one embodiment, sign 100 may be an advertisement displayed in a mall, airport or any other convenient location whereupon scanning sign 100 may automatically launch the mobile application 200 either at a home screen 200-1 or in another pre-determined portion within the application such as at 200-2 or 200-3. For example, if sign 200 is configured to direct a customer in finding a money transfer location, upon scanning the scanning area 102 of sign 100, mobile application 200 may launch within an agent locator screen 200-2. Inside agent locator screen 200-2, mobile application 200 provides the user with information regarding the nearest locations of a money transfer agents. Moreover, application 200 and/or screen 200-2 may include information regarding wait times at the particular locations, estimated travel times to the locations, etc., in order to best direct the user to a more desirable location where they may receive faster service.

Figure 3:
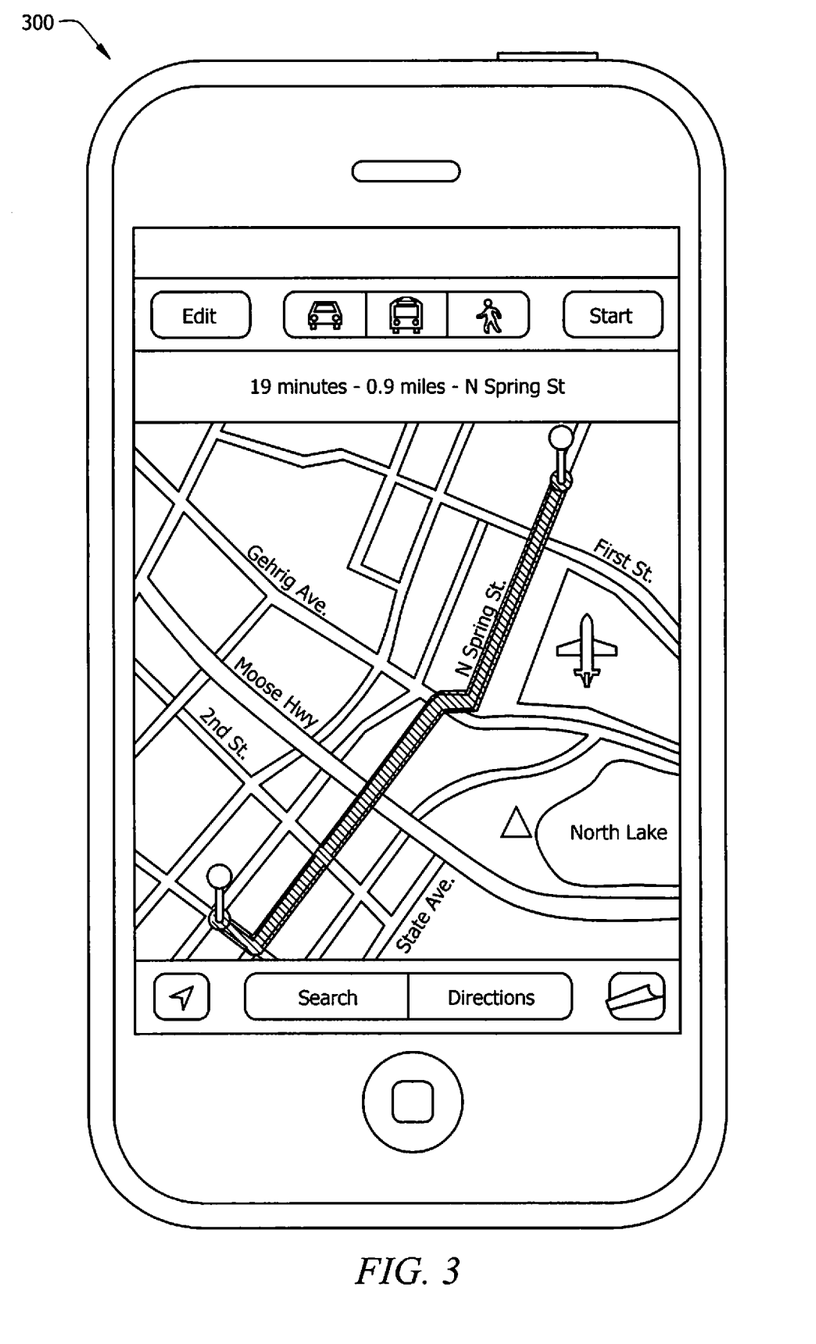
FIG. 3 illustrates a mobile device direction screen in accordance with an embodiment of the present application.

FIG. 3 illustrates a mobile device direction screen 300 in accordance with an embodiment of the present application. As shown, direction screen 300 provides directions to a user of a mobile device in order to direct the user to a physical location, such as a money transfer service location. The directions provided in direction screen 300 may be provided in response to a selection of a location listed on locator screen 200-2. Alternatively, the directions provided in direction screen 300 may be instantly provided upon scanning the scanning area 102 of sign 100. Further, in some embodiments the direction screen 300 may be part of mobile application 200, a third party application, or a selection within mobile application 200 may cause a third party mapping application to launch and display direction screen 300 on the mobile device.

Referring back to FIGS. 1 and 2, in some embodiments when a scanning device within scanning area 102 is read, the mobile device is provided with promotional materials or offers either within application 200 or at another contact point in the mobile device (e.g. in an email or text message). For example, upon scanning NFC chip 104 a mobile device may be loaded with one or more promotional offers, such as an offer for a discounted transaction fee for a money transfer transaction. This loaded content may come from the scanned information itself, or may be transferred to a mobile device over a communication network in response to information or commands received when scanning a near field communication-style scanning device. Further, promotional offers may come from partnership offers originating from one or more businesses which are associated with the owner of sign 100. For example, in a circumstance where a money transfer service agent is located within a larger retail establishment, promotional offers corresponding to that establishment may be provided and used to direct customer traffic accordingly.

In one embodiment a user-owned near field communication device (such as a mobile phone or other types of devices which are discussed below) may be tied to a user profile. Such a user profile may be entered into a mobile application by a user, may be compiled based on user actions (such as known information about user location, previous transactions, etc.), or may be derived from a combination of each.

A user profile may be used to provide information, e.g. personal identification information, payment information, and the like, in order to increase the efficiency of a transaction. Additionally, a user profile may be utilized to customize particular promotional offers to a user in order to better direct such promotions. For example, when a user scans a near-field communication device, information regarding where the device is located is known. This information may be used to send promotions to a user for a business that is proximate to the user. Additional profile information could also be used in order direct promotions to the user such as information regarding gender, income levels, previous transactions, previously redeemed promotions, etc.

Figure 4:
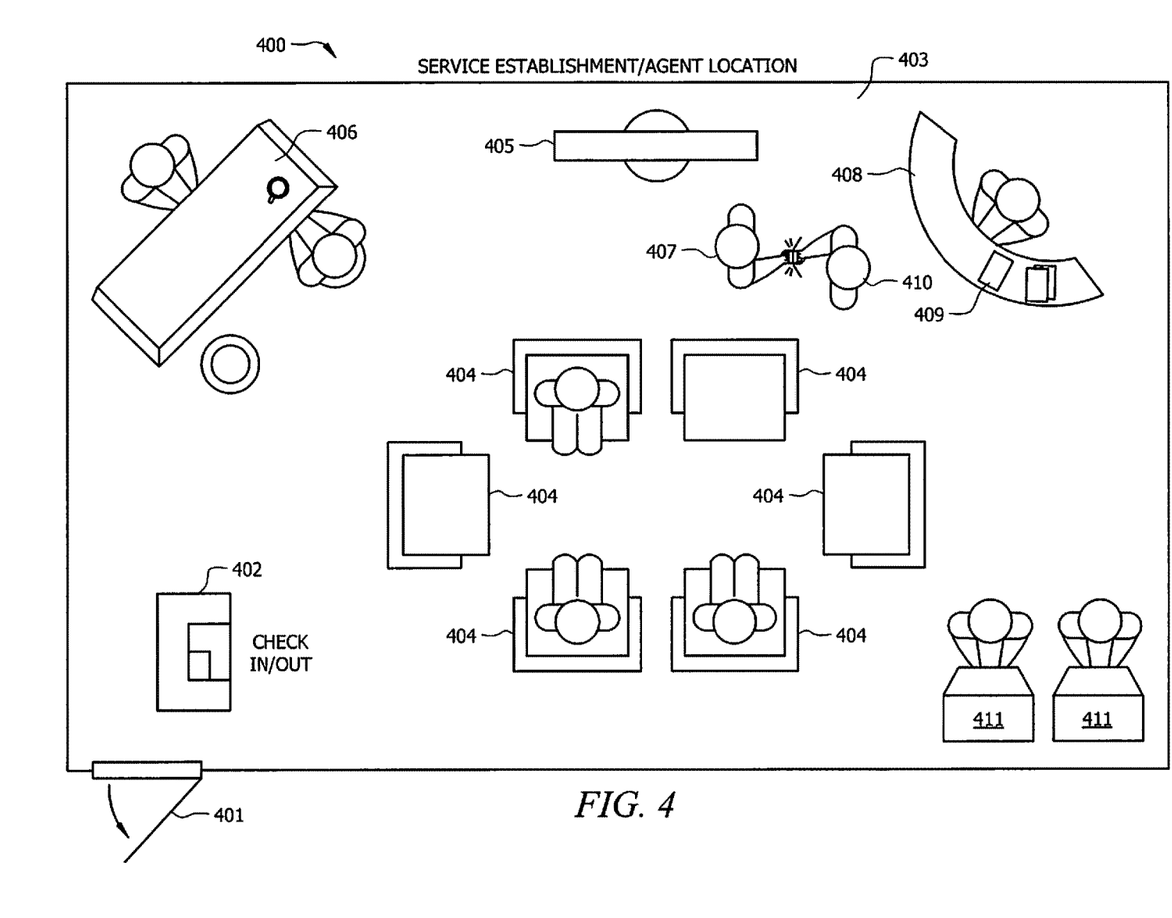
FIG. 4 illustrates an example service establishment location in accordance with an embodiment of the present application.

FIG. 4 illustrates an example service establishment location 400 in accordance with an embodiment of the present application. The illustrated embodiment will be described with respect to conducting a money transfer transaction. However, as indicated above, the inventive principles may be utilized for other types of transactions and other types of businesses. Establishment location 400 has an entrance 401. Near entrance 401, establishment location 400 includes a check in/check out near-field communication scanning point 402. Check in point 402 may be scanned by a customer upon arrival at location 400. This check in scan may be utilized in a number of ways. For example, a customer check in may act to place a customer in a waiting queue for service. Additionally, the check in point may mark a time entry for measuring waiting times which are provided in other areas such as in screen 200-2.

In the illustrated embodiment, establishment location 400 further includes a waiting area 403. Waiting area 403 may be configured with amenities which function to maximize a customer's comfort and experience within location 400. For example, waiting area 403 includes seating 404, a television 405 to temporarily entertain customers during waiting times, and a refreshment center 406. It is appreciated that many seating arrangements and amenities may be included in waiting area 403 in order to increase the customer experience. What is notable is that the automation of transaction encounters with a customer provided with embodiments of the present application provides for the ability to allow the customer's waiting experience to be utilized in a manner which is better than simply waiting in line for service.

Either before coming in, or while waiting in waiting area 403, customer 407 may compile information for a transaction. For example, customer 407 may fill in the appropriate information for a money transfer transaction about one or more of the sending party (i.e. the customer in this embodiment), and/or the receiving party. It is noted that much of this information may be retrieved from profile data as discussed above. When customer 407 has reached the front of the queue, the customer may be notified. This notification may be made in an announcement within establishment location 400, may be made via a notification sent to customer 407's mobile device, etc. Upon receiving this notification, customer 407 may approach customer service desk 408 to complete the transaction.

Customer service desk 408 may include near field scanning device 409. A customer may utilize this device for multiple tasks. For example, upon arriving at customer service desk 408, customer 407 may scan scanning device 409 with a mobile device. This scan may be used to identify the customer and bring information onto a screen of a customer service agent at customer service desk 408. Such information may be transmitted via the scan at scanning device 409, but may be conveyed in any other manner, e.g. via a Wi-Fi or cellular phone connection between an application residing on a customer's mobile device and the establishment. Further, information may come from profile data stored at a central server belonging to the business upon receiving a scan at the service location. Scanning device 409 may also be used to mark the end of the queuing time discussed above.

When completing the transaction, scanning device 409 may be utilized to receive an affirmation that customer 407 has reviewed and accepts the terms and conditions of a transaction. Further, scanning device 409 may be utilized to receive payment information or authorization from a customer. Such payment information may be included in a separate means which is read by scanning device 409, such as a credit card. Additionally, payment information may be included within a user profile, such as by linking a user account to a profile, whereupon scanning device 409 provides confirmation from a customer that deductions from such an account are authorized.

In one embodiment, a customer service agent 410 may be equipped with a separate mobile device which may be used to assist in generating and/or completing a transaction. For example, customer service agent 410 may approach a user and assist with the compiling of transaction information, e.g. enter verbally received receiving party information, sending party information, information about payment means, etc. Agent 410 may be given a portion of this information via scanning a mobile device of customer 407 or may receive this information from a central server upon scanning the mobile device. Further, in some embodiments, agent 410 may have all of the capabilities discussed above with respect to actions performed at customer service desk 409.

When leaving establishment location 400, a customer may again scan check in/check out device 402. This scan may be used to track statistics regarding total visit times or any other relevant statistics. Further, this scan may be used to trigger the sending of information to a customer's device such as promotional information and the like. It is noted, however, that the functionality of this scan may occur earlier in the process described above.

Figure 5:
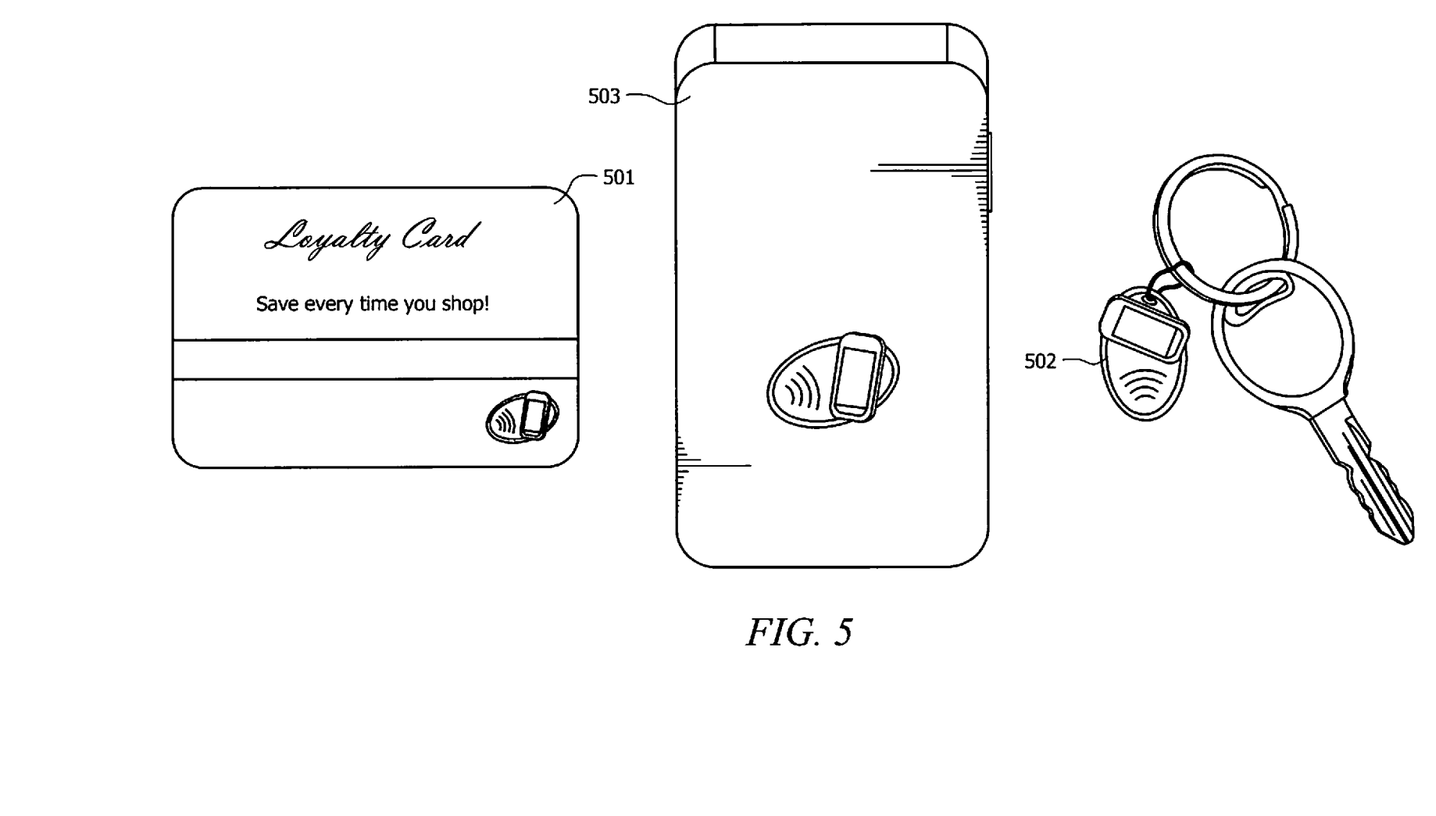
FIG. 5 illustrates alternative devices in the form of a customer-specific card such as a loyalty card, a keychain-type device, and a mobile device case having a near-field scanning device embedded therein.

In a circumstance where a customer does not have a mobile device with sufficient capabilities to perform the above actions, embodiments may provide for other types of near-field capable scanning devices. For example, FIG. 5 illustrates alternative devices in the form of a customer-specific card 501 such as a loyalty card, a keychain-type device 502, and a mobile device case 503 having a near-field scanning device embedded therein. Embodiments are not limited as to the types of objects which may be used to carry such a scanning device. It is recognized that with these types of devices, the type of information that can be sent to a customer is limited, however, such devices may still be useful in improving a customer experience. For example, profile data associated with a user may be associated with such devices and used in a transaction process as described above, or to obtain promotional offers, etc.

Referring back to FIG. 4, if a customer enters service establishment 400, the customer may utilize a scanning device, such as card 501 to check in at check in station 402. In the event that a customer does not have a near field capable device, a customer service agent may provide one to the customer. Once the customer is checked in, they may be placed into a queue and served in due course.

In one embodiment, service establishment 400 further includes kiosks 411 which may be utilized to perform various portions (or all) of the transaction process. For example, a customer may approach kiosk 411 and scan a near field device with a mobile device or another device, such as card 501. Kiosk 411 may utilize information derived from this scan to populate transaction fields, e.g. fields corresponding to information about the customer. The customer may enter additional information if needed and complete the transaction. In some embodiments, the transaction information may be entered and personal contact with a customer service agent may be needed. In such embodiments, the transaction information may be associated with the user's near field device whereupon it may be scanned by a customer service agent at a later point in order to complete the transaction.

Figure 6:
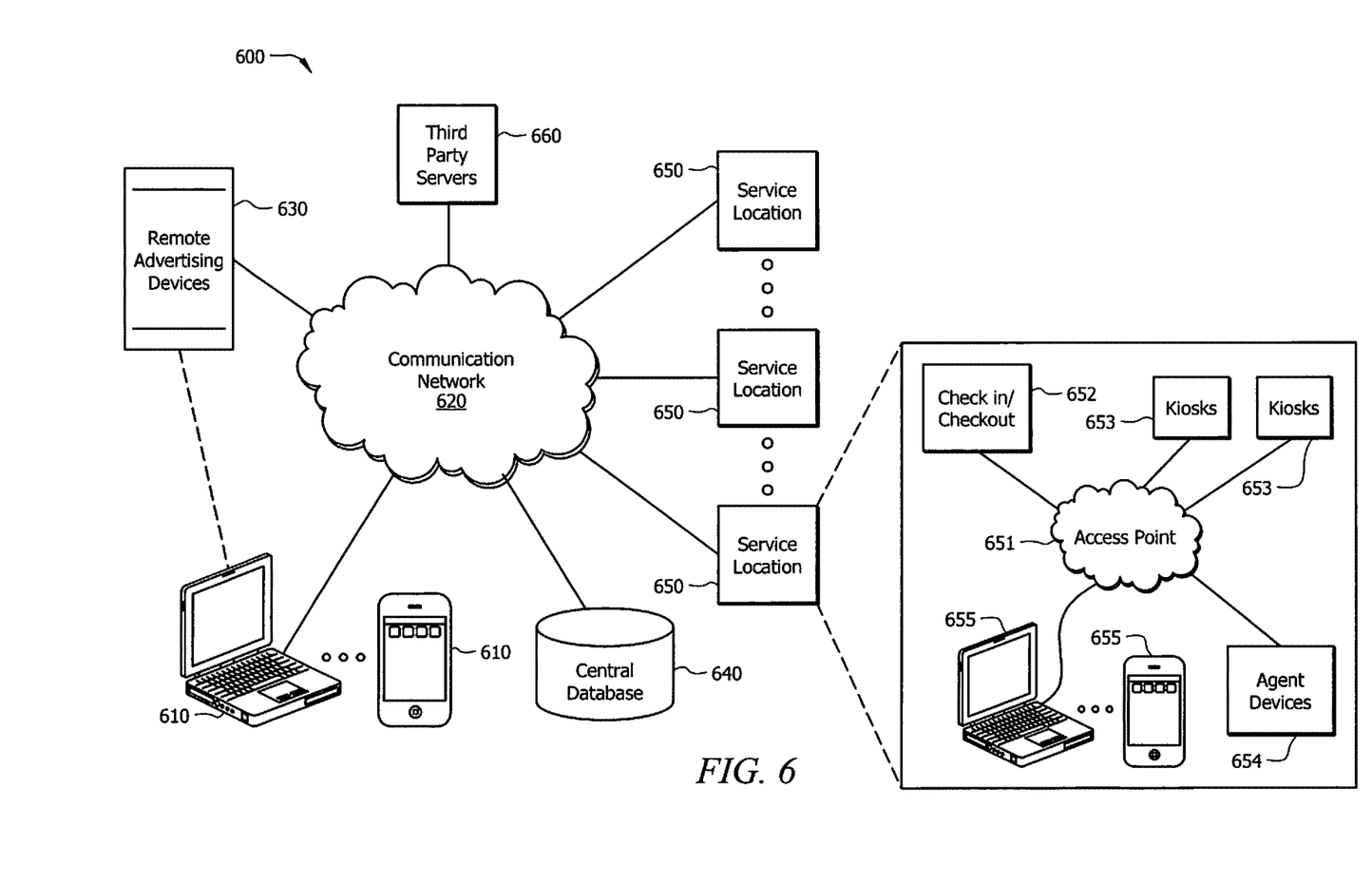
FIG. 6 illustrates a communication network in accordance with an embodiment of the present application.

FIG. 6 illustrates a communication network 600 in accordance with an embodiment of the present application. In the illustrated embodiment, system 600 includes a plurality user devices 601. User devices 601 may include any type of device which may be utilized in implementing the embodiments the present application, e.g. a mobile device, computer, tablet device, card, tag, and any other device which has near field communication capabilities.

In some embodiments, user devices 610 are configured to communicate over communication network 620. Communication network 620 may be a packet-switched network such as the World Wide Web, a cellular 3G/4G network, local area network, wide area network, or any other network configured to facilitate communications between the various devices of FIG. 6. Additionally, communication network 620 may be combination of networks working in conjunction to allow for the communications described for the embodiments herein.

In some embodiments, communication network 620 is communicatively coupled to one or more remote advertising devices 630. Remote advertising devices may be devices which are configured to provide information to posters or signs such as illustrated in FIG. 1. For example, a separate device may be utilized to program devices embedded within a sign or poster. Further, remote advertising devices 630 may comprise the actual signs or posters which may be in direct or indirect (via a programming device) communication with an off-site communication apparatus, such as central database 640 through communication network 620.

Communication network 600 further includes a plurality of service locations 650. A service location 650 may be implemented as illustrated with respect to service establishment 400 of FIG. 4. In such an embodiment, service location 650 may include a central access point 651 which is in communication with a check in/check out point 652, one or more kiosks 653, agent devices 654, and/or a user device 655.

Communication network 600 may further include one or more third-party servers 660. Such third-party servers may be used to provide information when cooperative efforts are utilized in delivering promotional offers. Further, third-party servers 660 may be utilized to provide information which is useful for a user profile in order to help further identify the user, assist with directing advertising efforts, and the like.

Figure 7:
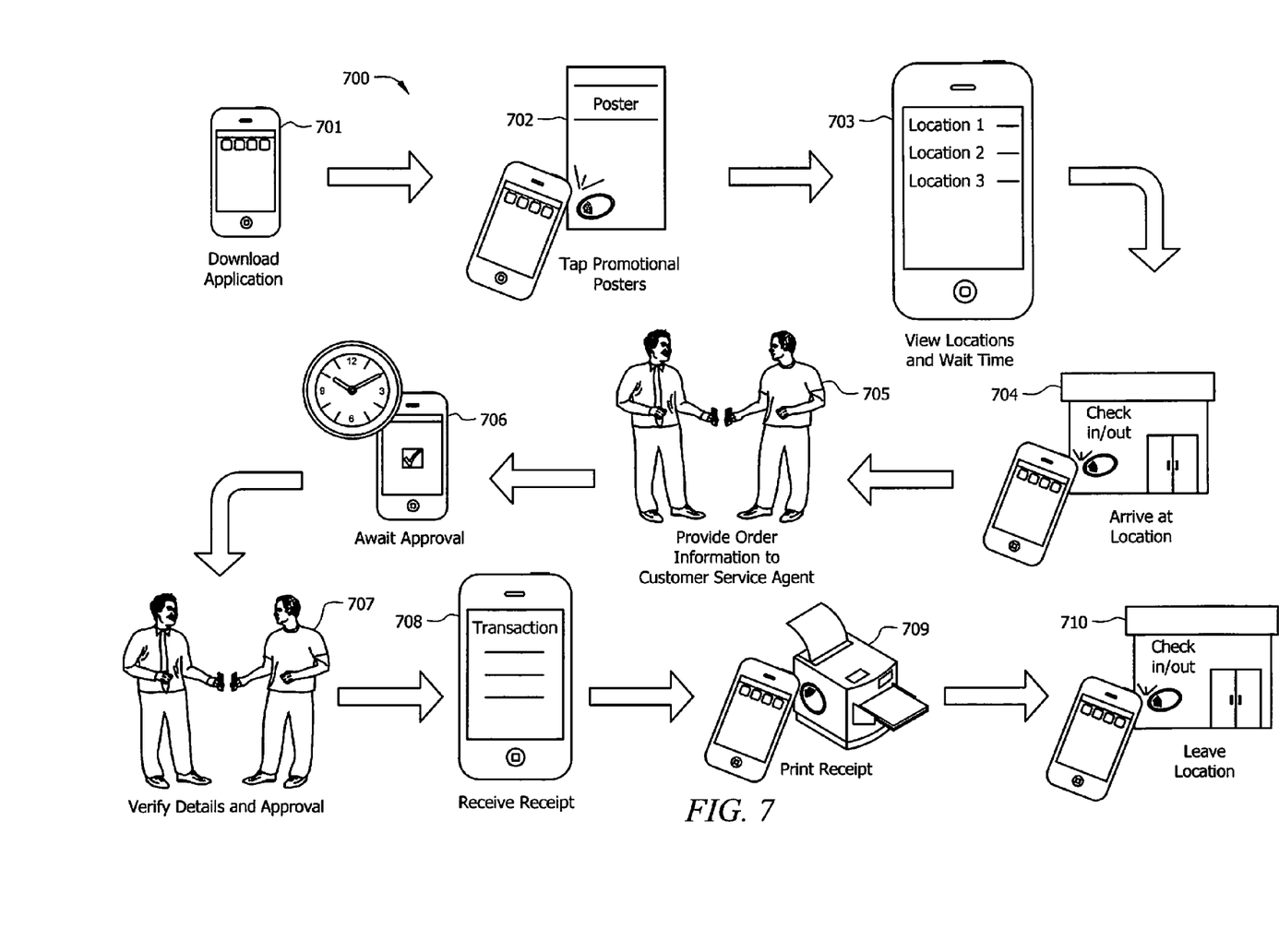
FIG. 7 illustrates a graphical transaction flow in accordance with an embodiment of the present application.

FIG. 7 illustrates a graphical transaction flow 700 in accordance with an embodiment of the present application. It is noted that such one or more steps of graphical flow 700 may be altered or even deleted depending on the particular application and type of transaction being implemented. As such, the following is provided for the purposes of illustration. Additionally, the description of transaction flow 700 will be given in the context of communications which may propagate over communication network 600 of FIG. 6, however, other communication networks may be used.

Transaction flow 700 begins with a user downloading a mobile device application 701. Such a mobile device application may be an iPhone® or Android-style application and may be configured by a particular business in accordance to preferences that may be specific to a business.

At step 702, a mobile device 610 belonging to a user "bumps" or scans a promotional poster 630. In response to this scan information is provided to mobile device 610 at point 703. In the illustrated embodiment, location and wait time information corresponding to a plurality of business locations are provided at mobile device 610. With this information, a user may select a particular business location and be given directions to the selected location.

It is notable that the information provided to the user's mobile device 610 may be provided in multiple ways. For example, the scan promotional poster 630 may convey the relevant information. Alternatively, the scan of promotional poster 630 may trigger the application resident on a mobile device 610 to retrieve the information. Such information may be provided over communication network 620 by one or more sources such as central database 640 third-party servers 660, etc.

At step 704 of flow 700 as a user arrives at a service location, such as service location 650, and scans or bumps check in/check out point 652. Upon checking in, the user is placed in the waiting queue for the service location. It is noted that service location 650 may be alerted to the arrival of a customer via a signal received from check in/check out point 652 or from a user device 610 communicating within the local network of service location 650. Alternatively, user device 610 may provide information to service location 650 corresponding to the check in scan over communication network 620.

It is appreciated that there are various communication paths that any information corresponding to transaction flow 700 can travel. It is also noted that different service locations may utilize different network types. For example, access point 651 may be strictly an internal network access point. Alternatively, access point 651 may be a Wi-Fi network which is accessible to a customer and a corresponding user device 610. Therefore, a user device may communicate with a service location over an internal network, over communication network 620, or a combination of both networks. Further, data derived from scanning a near-field communication point may be transmitted by the near field device over a local network or direct communication, or a scan may trigger another device, such as user device 610 to send data over one or more networks. Considerations regarding what network(s) handle specific communications and data transfer may take into account the type and amount of data being sent at any given point in time, the available bandwidth for data flow on the respective networks, the type of devices being used by the customer and/or service location, etc. The interconnectability of the various devices and networks described in the present application may be utilized to provide for more efficient information flow.

At step 705 of flow 700 the customer provides order information to a customer service agent. As can be seen by the above description, this information may be provided via a near field communication scan, data transmitted within an application resident on a smart phone, via data entered and provided over kiosks 653, etc. In some embodiments, the customer service agent may also supplement transaction information by receiving verbal instructions from a customer.

At step 706, the customer awaits approval and/or processing of the requested transaction. Once the details of the transaction are completed and a transaction is approved, a customer service agent verifies the details of the transaction, obtains the customer's approval of the terms and conditions of the transaction, and accepts payment for the transaction at step 707. This verification and approval of the terms and conditions may be provided via a scan of a near field communication device belonging to the customer.

With the transaction completed the customer may be provided an electronic transaction receipt to a user device 610 at step 708. The receipt may be provided through multiple means such as through communication with a downloaded application, over e-mail, a short message service (SMS) text message, by scanning a near field communication device, and the like. Additionally, a receipt may be printed at step 709. In some embodiments, a service location may further comprise a printer which may print a transaction receipt in response to a near field communication bump/scan.

Upon the customer completing the transaction, the customer exits service location 650 and may again scan check in/check out point 652 at step 710. It is noted that data derived from every point in this transaction may be utilized to improve the efficiency of the transaction and/or future transactions. For example, data regarding the timing of a customer's transaction may be utilized to update wait times which are provided to subsequent customers. Further, data derived from the various points in a transaction process may be utilized by a company in order to determine at which point inefficiencies exists in a transaction process. This data may be provided to central database 640 for processing and later use.

Figure 8:
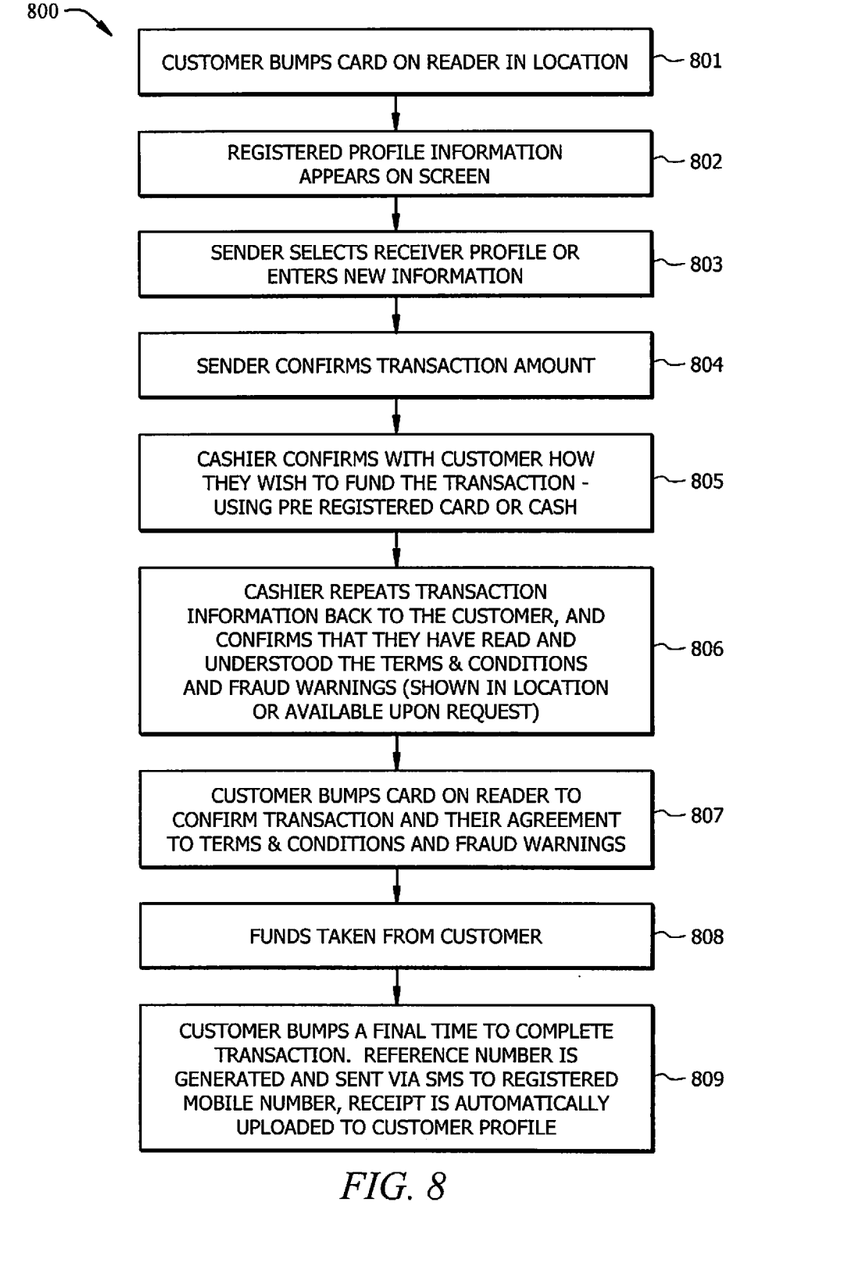
FIG. 8 illustrates an operational flow of a money transfer transaction from the perspective of a customer service agent within a particular location in accordance with an embodiment of the present application.

FIG. 8 illustrates an operational flow 800 of a money transfer transaction from the perspective of a customer service agent within a particular location in accordance with an embodiment of the present application. At block 801 the agent bumps/scans a reader with a customer's near field device (such as a card, mobile device, etc.), whereupon profile information of the user appears on the agent's computing device 802. At block 803, the sender may verify profile data or provide additional information regarding the sender and confirms the amount of money to be sent at 804. The agent then confirms how payment for the money transfer transaction will be effectuated, e.g. using cash, a preregistered account, etc., at block 805.

The agent may then repeat transaction information back to the customer and confirm that they understand the terms and conditions of the transaction and provide any fraud warnings which may be relevant to the transaction at block 806. The customer may then bump/scan a near field communication device to confirm the transaction details and agreement to the terms of the transaction at block 807.

With the transaction information finalized and terms agreed to, funds are taken from the customer at block 808. Such funds may come in normal payment forms such as cash, check, credit card, etc., or may also be deducted electronically from a customer account which is tied to the user profile of the customer. After payment is received, the customer may bump an agent device one more time in order to signify that the transaction is complete at 809. At the completion of a money transfer sending transaction, the customer may be given a reference code which is used by the receiving party to obtain the funds. This reference number may be delivered to a mobile device upon receiving the final bump. Alternatively, it may be sent to a device (via email, SMS, and the like) which is registered with the user profile.

Figure 9:
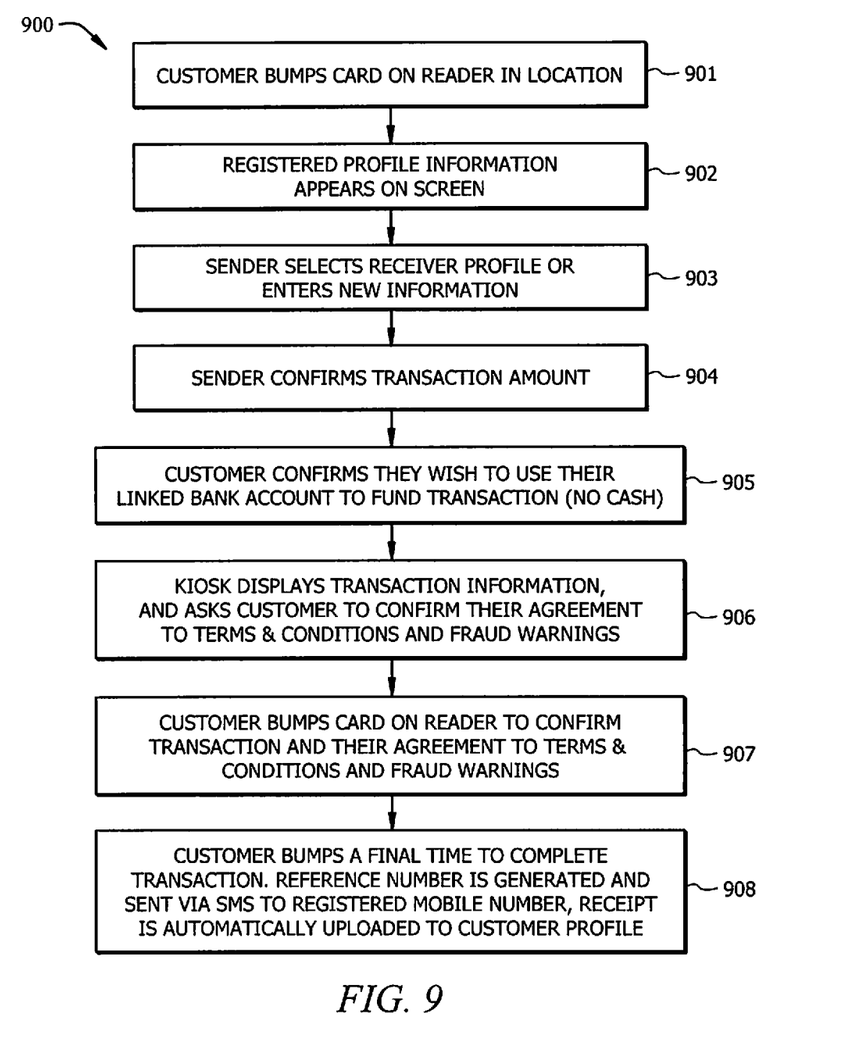
FIG. 9 illustrates an operational flow of a money transfer transaction from the perspective of a customer utilizing a kiosk at an agent location accordance with an embodiment of the present application.

FIG. 9 illustrates an operational flow 900 of a money transfer transaction from the perspective of a customer utilizing a kiosk at an agent location accordance with an embodiment of the present application. At block 901, the customer bumps a card reader on or near a kiosk at the agent location. This causes profile information corresponding to the customer to appear on the screen of the kiosk at 902. The customer may select a receiving party profile that is already present and tied to the customer's profile, or may enter new information about the receiving party at block 903. The customer also enters the transaction amount 904. In this embodiment, the customer is utilizing an account which is linked to the customer's profile and the customer confirms that this account will be used to fund the transaction at block 905.

At block 906 the kiosk displays the transaction information and asks the customer to confirm that the customer agrees with the terms and conditions of the transaction and/or has reviewed provided fraud warnings. To confirm that the customer agrees, the customer bumps a reader device with a near field communication device corresponding to the customer at block 907. After payment is processed, the customer may bump the kiosk one more time in order to signify that the transaction is complete at 908. At the completion of a money transfer sending transaction, the customer may be given a reference code which is used by the receiving party to obtain the funds. This reference number may be delivered to a mobile device upon receiving the final bump. Alternatively, it may be sent to a device (via email, SMS, and the like) which is registered with the user profile.

Figure 10:
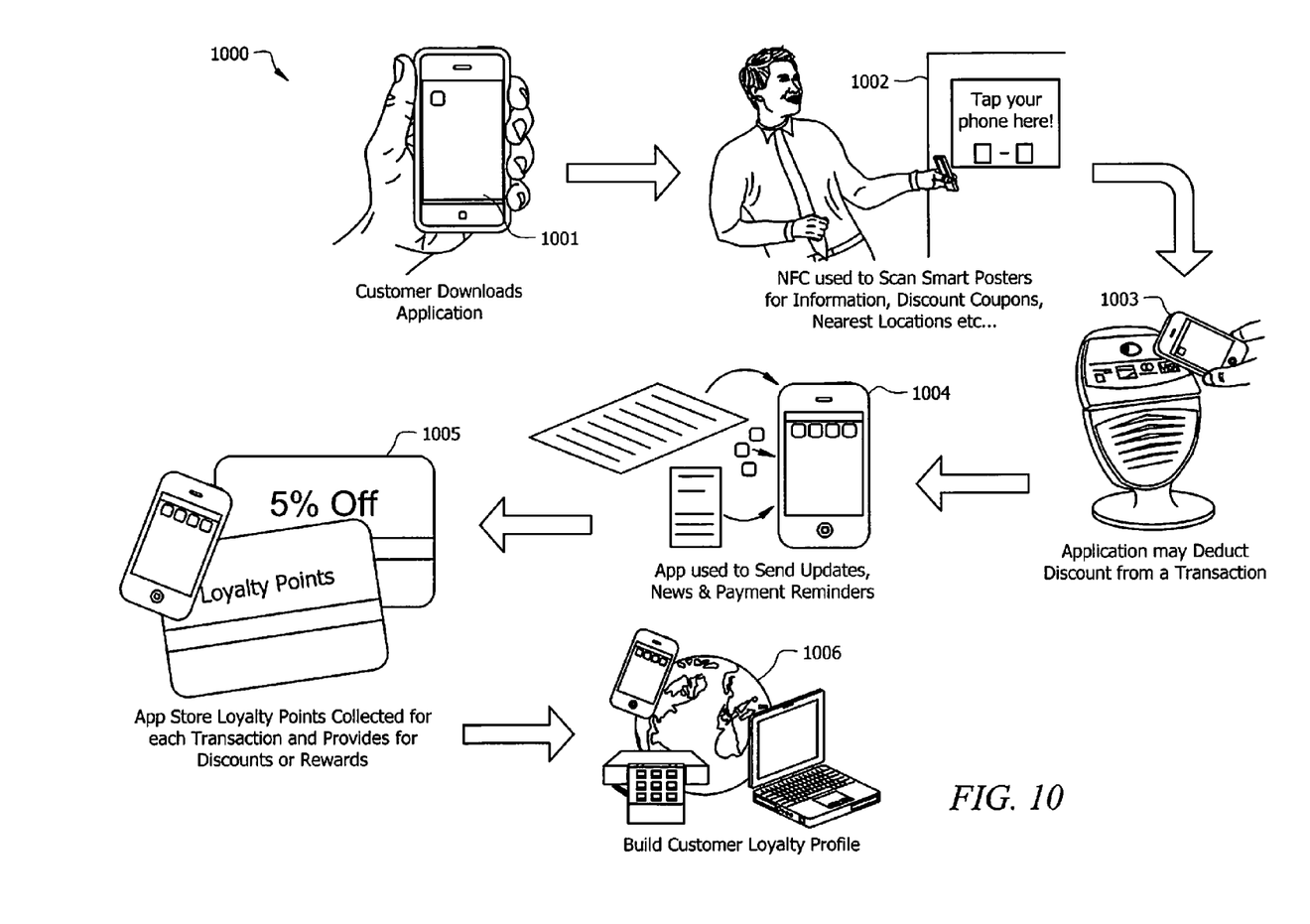
FIG. 10 illustrates a graphical flow of a promotional use of a near field communication-type device in accordance with an embodiment of the present application.

FIG. 10 illustrates a graphical flow 1000 of a promotional use of a near field communication-type device in accordance with an embodiment of the present application. At step 1001 a customer downloads a mobile application. Near field communication may be used to scan a smart poster and provide information (or cause the device to retrieve information) to the application or mobile device regarding discount coupons, nearest locations of a particular business, etc., at step 1002. The information provided to the mobile device (and in some embodiments the near field communication portion) may also be used to redeem promotions at step 1003.

The mobile application will generally contain profile information about the particular user of the mobile application. This information may be utilized to provide updates, news, reminders regarding bills or payments due from the user, and the like at step 1004. Further, the mobile application may utilize activity and/or profile data to administer a loyalty program which tracks transactions/purchases and provides for fee discounts for future transactions or rewards from partner organizations at step 1005. With this information, the company which administers the mobile application and/or loyalty program may continue to build on information which comprises the user profile at block 1006. Such information may be valuable in obtaining future business from the user or in directing paid advertisements and the like to the user.

It is noted that FIG. 10 is described in the context of a wireless device having near field communication capabilities. As described above, however, simple cards or tags may also be provided to a user in accordance with embodiments of the present application. While uses of such tags may be more limited, embodiments may still provide tangible benefits to customer using such a tag. For example, a user having a tag may proceed to bump a promotional poster with their tag, wherein doing so provides one or more of a reward, coupon, etc., to an online account, via e-mail, an SMS message, and the like. Further, a promotional poster may also be equipped with a printing device whereupon a bump of a user's tag causes promotional items to print from the printing device.

Additionally, as described above, the inventive concepts outlined herein may be applicable to many types of business establishments such as retail stores, restaurants, etc. For example, it would be helpful to a restaurant or retail store to utilize the inventive concepts described herein in order to direct customer traffic toward their locations. Further, such establishments may utilize check in procedures described above in order to maintain waiting queues. Moreover, a customer may utilize smartphone technologies, kiosks, and the like, to place orders (e.g. for food, consumer devices, etc.) while they wait at a location, and to eventually pay for these orders. Such capabilities are apparent to one of skill in the art reading the above disclosure.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for directing customer traffic to a physical establishment, said method comprising:
    providing a first near field communication device configured to be scanned by a mobile device;
    transmitting, in response to detecting that a customer has scanned the first near field communication device using the customer's mobile device, to said mobile device of the customer, information regarding a plurality of locations, each of the plurality of locations corresponding to an establishment associated with the first near field communication device, wherein each of the plurality of locations is remote to the first near field communication device, wherein said information regarding a plurality of locations includes current waiting times for each of the plurality of locations and address information corresponding to each of the plurality of locations, and wherein said information regarding said plurality of locations is stored in a database;
    providing a plurality of near field communication devices at a physical establishment, said physical establishment identified in said information regarding the plurality of locations, said plurality of near field communication devices configured to assist in a transaction flow of a customer encounter, wherein at least one of said plurality of near field communication devices located at the physical establishment is configured to:
        initiate reception, from said mobile device, of customer profile data to be used in a given transaction;
        monitor wait times for a customer undertaking a transaction at the physical establishment, wherein the monitoring includes:
            marking a time entry corresponding to a customer check-in time, wherein said customer check-in time corresponds to a time when said customer is placed in a waiting queue, said waiting queue storing information associated with customers at the physical establishment waiting to engage in transaction services offered at the physical establishment;
            providing a notification to said customer when said customer reaches a front of the queue, wherein said customer receives the transaction services subsequent to receiving the notification, and wherein the transaction services facilitate completion of the transaction of said customer; and
            initiating reception of additional information from said mobile device, said additional information indicating that said transaction has been completed;
        determine a total visit time for said transaction based on the time entry corresponding to the customer check-in time and a time when said additional information indicating that said transaction has been completed is received from said mobile device; and
    updating said information regarding said plurality of locations stored at said database based on said monitoring to produce updated information regarding said plurality of locations that includes updated waiting times for at least one of said plurality of locations, wherein, after said information regarding said plurality of locations has been updated, said updated information regarding said plurality of locations is transmitted to a scanning device in response to detecting a scan of the first near field communication device by said scanning device;
    receiving transaction information in response to said customer scanning one of said plurality of near field communication devices with said mobile device; and
    configuring at least a portion of said transaction using said transaction information received from said mobile device.

2. The method of claim 1 further comprising transmitting travel direction information upon receiving a selection of an address corresponding to a location of the plurality of locations.

3. The method of claim 1 further comprising transmitting at least one promotional offer to a customer upon the customer scanning the near field communication device, wherein said at least one promotional offer comprises at least one of a discount offer to an establishment associated with the near field communication device and a discount offer to a third party establishment.

4. The method of claim 1, wherein the plurality of near field communication devices at the physical establishment includes a near field communication device located proximate a customer service desk located at the physical establishment, wherein the near field communication device captures transaction processing information from said mobile device in response to being scanned by said mobile device, wherein said transaction processing information indicates that said transaction is being processed by a customer service representative, and wherein the method includes updating wait time information based on said time entry corresponding to said customer check-in time and a time when said transaction processing information was captured.

5. The method of claim 4, wherein said near field communication device is further configured to receive affirmation information from the mobile device, wherein the affirmation information is received in response to scanning said near field communication device with said mobile device, wherein said affirmation information indicates that said customer has accepted terms and conditions associated with said transaction, and wherein said affirmation information is received prior to said near field communication device located proximate said customer service desk capturing said transaction processing information.

6. The method of claim 5, wherein the method includes analyzing time stamps corresponding to various stages of said transaction to identify inefficiencies in one or more stages of the transaction flow, wherein each of the time stamps corresponds to a time when one of said plurality of near field communication devices is scanned by mobile devices, and wherein each of the plurality of near field communication devices is associated with a particular stage of the transaction flow.

7. A system for providing one or more services to a user, the system comprising:
  one or more agent locations, wherein each of the one or more agent locations is configured to provide one or more transaction services to a user, wherein each of the one or more transaction services is associated with a transaction flow corresponding to a sequence of actions performed to provide a particular transaction service of the one or more transaction services to the user;
  a first plurality of near field communication (NFC) devices, wherein the first plurality of NFC devices comprises one or more subsets of NFC devices, each of the one or more subsets of NFC devices of the first plurality of NFC devices comprising NFC devices located at a particular agent location of the one or more agent locations, wherein each subset of NFC devices located at an agent location comprise:
    a first NFC device located proximate to an entrance of the particular agent location, wherein, at each of the one or more agent locations, the first NFC device is configured to be scanned by a mobile device of the user to check-in the user and to check-out the user, wherein checking in the user places the user in a transaction service queue, wherein the first NFC device captures timestamp information each time the first NFC device is scanned by the mobile device of the user, wherein the timestamp information captured by the first NFC device includes a first timestamp corresponding to a first time when the user scanned the first NFC device using the mobile device and a second timestamp corresponding to a second time when the user scanned the first NFC device using the mobile device, and wherein the first timestamp corresponds to a check-in time and the second timestamp corresponds to a check-out time;
    a second NFC device located proximate to an agent device, wherein the agent device is operated by an agent employed at the particular agent location to provide at least one transaction service of the one or more transaction services to the user, wherein the second NFC device is configured to be scanned by the mobile device of the user during providing of the at least one transaction service to the user, wherein a first scan of the second NFC device provides transaction detail information regarding the at least one transaction service to the agent device for presentation to the agent, and wherein a second scan of the second NFC device confirms acceptance by the user of one or more terms and conditions associated with the at least one transaction service, and wherein the agent device is configured to receive inputs from the agent;
  a second plurality of NFC devices located remote from the one or more agent locations and configured to provide information to the user in response to being scanned by the mobile device of the user, wherein the information provided to the user in response to scanning one of the second plurality of NFC devices with the mobile device of the user comprises location information corresponding to at least one of the one or more agent locations and wait time information corresponding to an amount of time the user will wait to receive a transaction service at a corresponding agent location, wherein, for a particular transaction service, the transaction flow comprises the steps of:
    providing, by a particular NFC device of the second plurality of NFC devices, the location information and the wait time information in response to a scan of the particular NFC device of the second plurality of NFC devices by the mobile device of the user;
    detecting, by a particular first NFC device of the first plurality of NFC devices, a scan by the mobile device of the user, wherein the particular first NFC device is located proximate an entrance to a first agent location of the one or more agent locations;
    in response to detection of the scan by the mobile device of the user:
      placing the user in a particular transaction service queue storing information associated with users waiting to receive transaction services at the first agent location; and
      marking a check-in time corresponding to when the user was placed in the particular transaction service queue;
    transmitting a notification to the user when the user has reached the front of the particular transaction service queue, wherein the notification is transmitted to the mobile device of the user;
    detecting, by a particular second NFC device of the first plurality of NFC devices, a scan by the mobile device of the user, wherein the particular second NFC device of the first plurality of NFC devices is located proximate to an agent device at the first agent location;
    in response to the scan of the particular NFC device of the first plurality of NFC devices:
      marking an end of queueing time to indicate that the user has been removed from the particular transaction service queue; and
      presenting transaction details at the agent device, the transaction details comprising information that facilitates the providing of a particular service to the user;
    receiving an input indicating the user has accepted one or more terms of the particular service;
    receiving payment information from the user;
    in response to receiving the payment information, providing the particular service to the user;
    determining a check-out time indicating when the user has received the particular service; and
    tracking statistics and total visit times based, at least in part, on the check-in time and the check-out time;
  a database storing at least the location information and the wait time information; and
  a central server in communication with each NFC device of the first plurality of NFC devices and each NFC device of the second plurality of NFC devices, wherein the central server is configured to:

provide backend support for providing the one or more transaction services to the user;

analyze the statistics and total visit times to identify inefficiencies in one or more steps of the transaction flow of the particular transaction service; and update, based on the statistics and total visit times, the wait time information at the database to produce updated wait time information, wherein, after the wait time information has been updated, the updated wait time information is provided to a scanning device in response to detecting a scan of the particular NFC device of the second plurality of NFC devices by said scanning device.

8. The system of claim 7, wherein the check-out time is determined by detecting a second scan of the particular first NFC device by the mobile device of the user.

9. The system of claim 7, wherein the input indicating that the user has accepted the terms and conditions is received via a second scan of the particular second NFC device by the mobile device of the user.

\* \* \* \* \*